United States Patent
Parker et al.

(10) Patent No.: US 6,690,407 B1
(45) Date of Patent: *Feb. 10, 2004

(54) OBTAINING ON-DEMAND GOODS AND SERVICES USING VIDEO TELEPHONY

(75) Inventors: Benjamin J. Parker, Overland Park, KS (US); Shane R. Werner, Olathe, KS (US); Charles Diaz, Overland Park, KS (US); Terry M. Frederick, Lenexa, KS (US); Terry T. Yu, Overland Park, KS (US)

(73) Assignee: Sprint Communications Company, L.P., Overland Park, KS (US)

(*) Notice: Subject to any disclaimer, the term of this patent is extended or adjusted under 35 U.S.C. 154(b) by 14 days.

This patent is subject to a terminal disclaimer.

(21) Appl. No.: 10/058,517

(22) Filed: Jan. 28, 2002

Related U.S. Application Data (63) Continuation-in-part of application No. 10/033,813, filed on Dec. 20, 2001, which is a continuation-in-part of application No. 09/978,616, filed on Oct. 16, 2001.

(51) Int. Cl.[7] .................................................. H04N 7/14
(52) U.S. Cl. ................................ 348/14.01; 379/93.12; 379/265.01
(58) Field of Search ......................... 348/14.01–14.09, 348/14.1, 14.11–14.13; 709/204, 203, 217, 218; 705/26; 370/352; 379/93.12, 90.01, 265.01

(56) References Cited

U.S. PATENT DOCUMENTS

| | | | |
|---|---|---|---|
| 5,689,553 A | 11/1997 | Ahuja et al. | |
| 5,764,916 A | 6/1998 | Busey et al. | |
| 6,097,793 A | 8/2000 | Jändel | |
| 6,337,858 B1 | 1/2002 | Petty et al. | |
| 2002/0032809 A1 * | 3/2002 | Bateman et al. | 710/5 |
| 2003/0021259 A1 * | 1/2003 | Miloslavsky et al. | 370/352 |

FOREIGN PATENT DOCUMENTS

| | | |
|---|---|---|
| EP | 0 721266 | 7/1996 |
| EP | 0 999712 | 5/2000 |
| EP | 1 059 798 | 12/2000 |
| GB | 2357659 | 6/2001 |
| WO | WO 01/71994 | 9/2001 |

* cited by examiner

*Primary Examiner*—Melur Ramakrishnaiah

(57) ABSTRACT

A combined telephonic/computerized on-demand ordering system for goods or services employs a computer network communication session that is established automatically in response to a telephone call made from a requestor to a provider. The computer network data call can provide video images synchronized to menu selections presented by an automated telephone response system.

25 Claims, 6 Drawing Sheets

OBTAINING ON-DEMAND GOODS AND SERVICES USING VIDEO TELEPHONY

CROSS REFERENCE TO RELATED APPLICATIONS

The present application is a continuation-in-part of pending U.S. application Ser. No. 10/033,813, filed Dec. 20, 2001, entitled "Telephonic Addressing For Establishing Simultaneous Voice and Computer Network Connections," which is a continuation-in-part of prior U.S. application Ser. No. 09/978,616, filed Oct. 16, 2001, entitled "Video Telephony." This application is further related to co-pending U.S. applications Ser. No. 10/058,549, filed Jan. 24, 2002, entitled "Private Sharing of Computer Resources Over an Internetwork"; Ser. No. 10/058,882, filed Jan. 28, 2002, entitled "Sharing of Prerecorded Motion Video Over an Internetwork"; and 10/058,886, filed Jan. 28, 2002, entitled "Coordination of Video Sessions When Calling an Auto-Attendant System," all incorporated herein by reference.

STATEMENT REGARDING FEDERALLY SPONSORED RESEARCH

Not Applicable.

BACKGROUND OF THE INVENTION

1. Field of the Invention

The present invention relates to a combined telephonic/computerized on-demand ordering system for goods or services wherein a computer network communication session is established automatically in response to a telephone call made from a requestor to a provider. The computer network data call provides video images synchronized to menu selections presented by an automated telephone response system, for example.

Electronic commerce over the Internet has rapidly developed. A potential purchaser may navigate with their web browser to a provider's (i.e., vendor's) web page to view textual, audio, and graphic information about goods or services prior to making a selection decision. While many Internet users have accepted or even embraced this kind of electronic commerce, other users are reluctant to use it for many reasons such as unfamiliarity, lack of understanding, worries over security of credit card information, or personal preference.

Telephonic ordering (e.g., a toll-free call to a sales representative) is also a wide used form of commerce. It is often made available in conjunction with or as a backup to on-line Internet ordering or for customers without access to or interest in on-line ordering. A drawback of telephonic ordering is that information that can be provided to the potential purchaser is limited to audio information (either prerecorded or spoken by a live operator).

Thus, it would be desirable to provide a means of acquiring goods or services with the simplicity of telephonic ordering while providing the ability to display video images to the potential purchaser.

2. Description of the Related Art

Internetworking (i.e., the interconnection of many computer networks) allows the interaction of very large numbers of computers and computer users. The most well known example is the Internet. Computers connected to the Internet may be widely separated geographically and utilize many different hardware and software configurations. In order to achieve communication sessions between any two endpoints on the Internet, an addressing system and various standard protocols for exchanging computer data packets have been developed.

Each packet sent over the Internet includes fields that specify the source and destination address of the packet according to Internet Protocol (IP) addresses assigned to the network interface nodes involved. Currently assigned addresses comprise 32 bits, although future standards allow for 128 bit addresses. The 32 bit addresses are normally written by breaking the 32 bits into 4 groups of 8 bits each and writing the decimal equivalents of each group separated by periods (e.g., 208.25.106.10).

Since numerical IP addresses are inconvenient to use and remember, a protocol for assigning and accessing logical names is used known as the domain name system (DNS). DNS servers are deployed within the Internet which perform a translation function between a logical domain name such as "sprint.com" and its numerical equivalent "208.25.106.10". After receiving an IP address back from a DNS server, a computer can forward data packets to the IP address and establish a connection or session with the remote computer.

While the DNS system works well for hosted content (e.g., material made available for browsing by commercial and private entities), it is not well suited to ad hoc communications or exchanges of data between individuals. Hosting a website and registering an IP address within the DNS system is expensive and time consuming. Furthermore, due to an impending shortage of IP addresses and the cost for maintaining use of each IP address, many Internet service providers assign IP addresses dynamically to their individual users. In other words, when a user signs on to their service, they are temporarily assigned an IP address from an address pool assigned to their service provider. The user occupies that IP address only for their current session.

Even when individual users have their own static IP addresses, and when other users can remember the IP address of a user with whom they would like to establish a connection session over the Internet (e.g., for voice or video telephony), the need to configure their hardware or software is too complex for many users. This is one reason why e-mail is such a popular and successful Internet application. A mail server with an easy to remember domain name acts as intermediary between two individual users. Using a simple application program and the recipient's account name on the mail server (i.e., their e-mail address), text messages and computer files can be exchanged. The exchange, however, does not allow the users to interact in real time. Thus, there is a need for a way to allow two or more individual users to establish interactive connection sessions over the Internet without requiring overt knowledge of the other's IP address and without complicated configurations or set-ups.

Copending applications U.S. Ser. Nos. 09/978,616 and 10/033,813 teach the use of a central server allowing two or more individual users to establish interactive connection sessions over the Internet without requiring overt knowledge of the other's IP address and without complicated configurations or set-ups. Each user registers with the central server, resulting in a database of users and their current IP addresses. A calling user sends a request to the central server to establish a connection with a called user. The central server can either relay all network message packets between the users for the duration of a "call", or it may provide the IP addresses to the users so that they can exchange packets directly. The called user may be identified within the database by information well known or easily discovered by other users, such as their telephone number. A telephone call may be established simultaneously with establishing the computer network session, thereby enhancing the user interaction regardless of the type of computer data to be exchanged (e.g., video frames, computer files, etc.). In one embodiment, the computer network session is automatically established in response to the act of dialing the called user's telephone number.

SUMMARY OF THE INVENTION

The present invention provides an on-demand ordering system for goods or services employing a computer network communication session that is established automatically in response to a telephone call made from a requester to a provider. The computer network data call provides video images synchronized to menu selections presented by an automated telephone response system.

In one aspect of the invention, a method is provided for acquiring goods or services from a provider. A requestor dials a telephone number of the provider to establish a telephone call over a public switched telephone network. The telephone number is input (preferably automatically) to a first computer accessible to the requester, the first computer being connected to a computer network. The telephone number is transmitted to a central server within the computer network. A central server within the computer network maintains a database of registered providers, their telephone numbers, and IP addresses of provider computers. The database is checked for the dialed telephone number. If the dialed telephone number is found, then a data call is established between the first computer and a provider computer identified by the database. Video images concerning the goods or services are transmitted within the data call. The requestor indicates a selection of one of the goods or services. The provider delivers the chosen good or service to the requester.

DETAILED DESCRIPTION OF PREFERRED EMBODIMENTS

Figure 1:
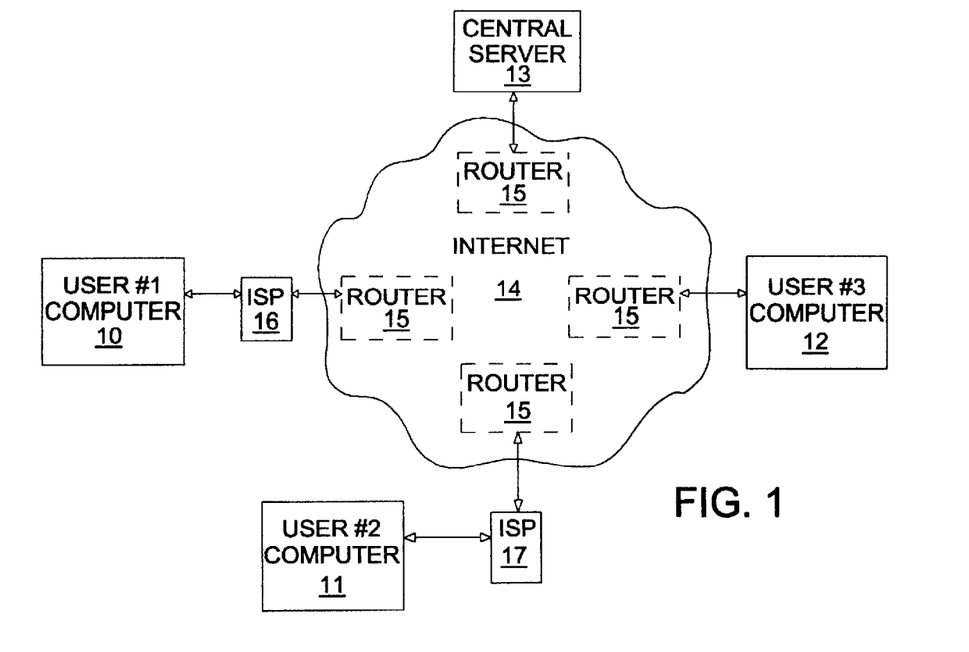
FIG. 1 is a block diagram showing the interconnection of users over the Internet to the central server of the present invention.

Referring to FIG. 1, a plurality of user computers 10, 11, and 12, and a central server 13 are internetworked via the Internet 14. A plurality of routers 15 within Internet 14 direct packets between various endpoints or nodes. Computers 10 and 11 are shown as being connected to Internet routers belonging to Internet Service Providers (ISP's) 16 and 17, respectively. The connections to the ISP's may be by dial-up, digital subscriber line (DSL), cable modem, or integrated access device (IAD), for example. Central server 13 and computer 12 are shown directly connected to a router.

Network communication comprises data messages or packets transferred between separate endpoints, such as between computers 10, 11, or 12 (as clients) and central server 13. The packet transfer is accomplished by routers 15 using the IP addresses contained in each packet. Central server 13 typically has a fixed IP address that is listed on the DNS servers accessible to each computer. Each computer user can easily communicate with central server 13 by supplying its logical name (e.g., www.sprint.exchange.com) which is automatically resolved by their browser into an IP address by consulting a DNS server. Exchanging packets between users 10, 11, and 12 themselves cannot usually be accomplished in the same way because the users and their IP addresses are not listed in the DNS system. Furthermore, users 10, 11, and 12 may not wish to allow remote access into their computers except in certain circumstances.

Figure 2:
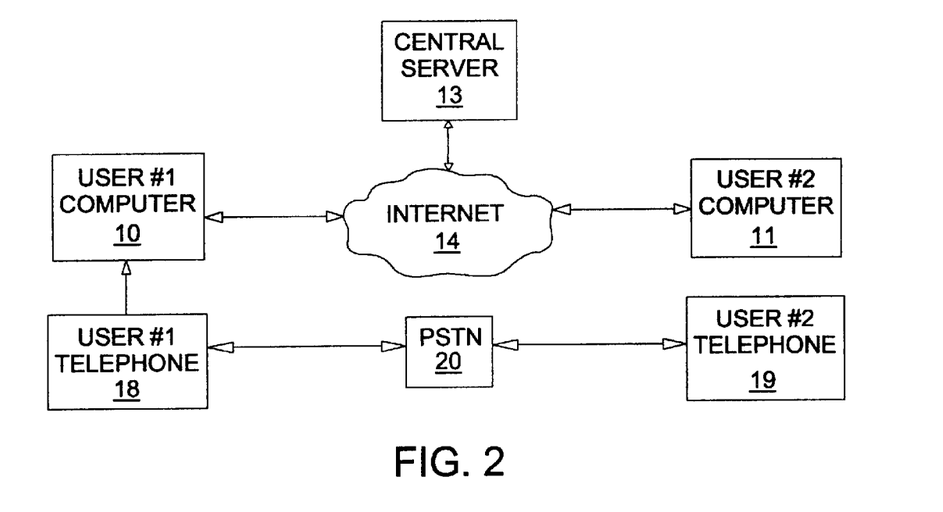
FIG. 2 is a block diagram showing a user connection model.

The present invention facilitates exchanging data messages between two separate, private computers by providing a specialized directory or look-up within central sever 13. As shown in FIG. 2, the present invention may be used within a system that functions to simultaneously establish a voice telephone call between the two individual computer users. In certain embodiments, the voice call serves as the user action that initiates the computer processing to establish the computer-to-computer connection. In addition, the voice call provides a way to alert the called party of the request to establish the computer connection and then serves to enhance the interaction between the two users during the exchange of computer data.

Regarding the embodiment with a simultaneous voice telephone call in FIG. 2, computers 10 and 11 have associated telephones 18 and 19 used by the same respective users. The computers and telephones may be fixed installations (e.g., in a residence or a business office) or may be mobile devices (e.g., laptop computer and cellular phone), as long as both are accessible to each user at the same time. The telephones are connected to the public switched telephone network (PSTN) 20. Central server 13 provides a user look-up and interconnecting service for registered users. For security and/or billing purposes, access to the service preferably is tied to user ID's and passwords. A user may be given an ID and password with initial sign-up for the service. Each user would manually configure the telephone number that they want to be associated with. When the user is "on-line" (i.e., has their computer turned on and connected to Internet 14), their computer sends a registration message to central server 13 to notify it that the user is available. Central server 13 can inspect the registration message to determine the current IP address and port number at which the user resides for its current connection session. Alternatively, the user may manually configure their IP address in some circumstances. Upon registration, central server 13 may preferably determine whether the user has a respective firewall as described in copending U.S. application Ser. No. 10/034,012, filed Dec. 20, 2001. In any case, central server 13 contains a database of currently active, registered users. Each user entry in the database includes fields for user ID, password, telephone number, and IP address (including port number), user status, and a firewall flag, for example. As described in more detail below, when using the invention for e-commerce transactions the user information stored in the database may also include shipping and billing address information and credit card numbers, for example.

In the general connection model of FIG. 2, a user #1 dials telephone 18 to make a voice call to a user #2 at telephone 19. The telephone number dialed by user #1 is captured as a target telephone identifier number and sent to a call client (i.e., an application program for managing the data call) in computer 10 being used by user #1. Computer 10 forwards the target telephone number to central server 13 as part of an access request for establishing a connection with user #2. Central server 13 looks up the target number in its database. When it finds the target number, central server 13 identifies the IP address associated with user #2 and sends an initiation message to computer 11 being used by user #2. When computer 11 receives the initiation message, it launches its own call client (if not already running). The initiation message may identify user #1 (preferably by both telephone number and user ID) and the type of data to be exchanged (i.e., the application program or how the call client should be configured to receive the data). User #2 answers the telephone voice call and learns that an initiation message was sent to their computer. Using computer 11, user #2 can verify the calling party as user #1 and can indicate whether they accept the computer network connection (i.e., the data call) with user #1. Once user #2 accepts, data messages can be exchanged between the call client application programs running on computers 10 and 11. The call client application programs can be written to perform file transfers of various types of files, video data or frames for video telephony, or other real-time data or control signals.

Figure 3:
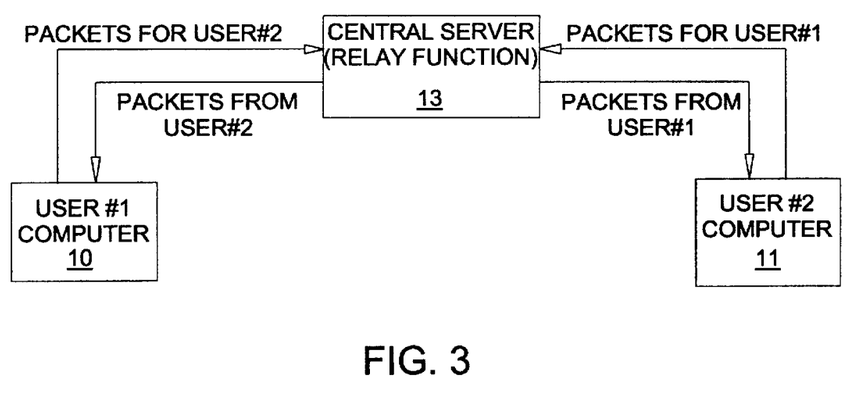
FIG. 3 is a block diagram showing a first embodiment of packet flow for a data call.

A first packet exchange configuration is shown in FIG. 3 wherein central server 13 performs a relay function such that all packets exchanged between computer 10 and computer 11 pass through central server 13. In other words, after a desired user (called party) accepts the data call and central server 13 notifies the first user (calling party) of the acceptance, both endpoints continue to address their sent packets to central server 13. At central server 13, each packet is redirected by substitution of IP addresses. For example, a packet sent from computer 10 including its own IP address as the source address of the packet and the IP address of central server 13 as the destination address of the packet is modified after being received by central server 13 to have the central server's address as its source address and to have the IP address of computer 11 as its destination address. After modification, central server 13 sends the packet back to its router and on to computer 11. The same operations are used to send packets from computer 11 to computer 10. The embodiment of FIG. 3 has the advantage that greater privacy of a user's IP address is maintained since each user's computer only needs to see the IP address of central server 13. Furthermore, this configuration can readily function in the presence of network address translation (NAT) firewalls at the endpoints.

Figure 4:
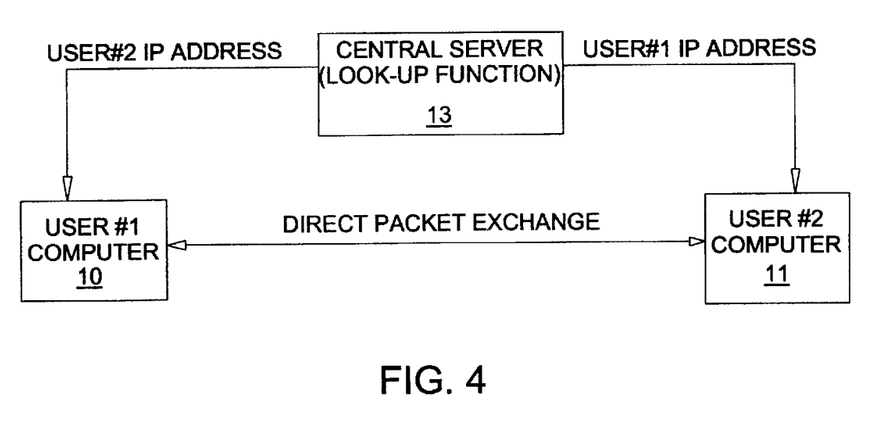
FIG. 4 is a block diagram showing a second embodiment of packet flow for a data call.

FIG. 4 shows an alternative configuration in which direct packet exchange between computers 10 and 11 is realized. Central server 13 provides a look-up function and a connection initiation function. If desired user #2 (called party) accepts a data call, then central server 13 provides the IP address of computer 11 to computer 10 and provides the IP address of computer 10 to computer 11. Thereafter, each computer can send packets addressed to the other computer and the packets are no longer relayed through central server 13. This embodiment has the advantage that central server 13 may be reduced in size since less traffic flows through it.

Figure 5:
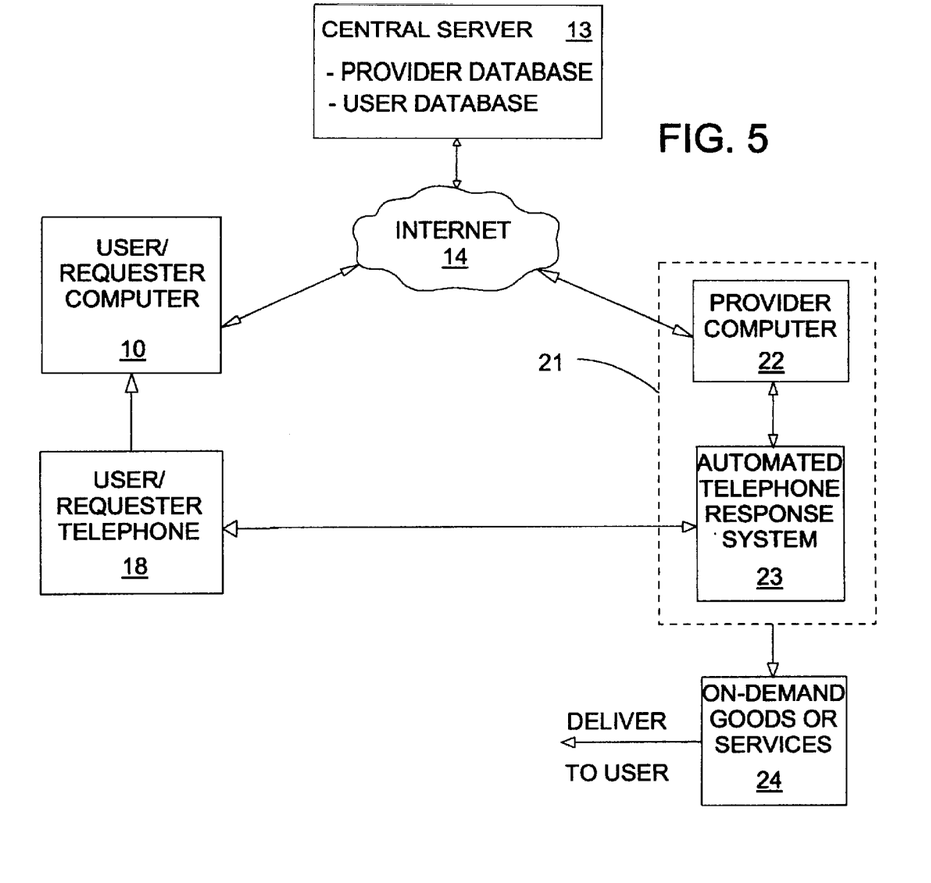
FIG. 5 is a block diagram of a communication model for the ordering system of the present invention.

The adaptation of the foregoing network data call to uses in e-commerce is shown in FIG. 5. The central database on central server 13 may be partitioned into a user database and a provider database, if desired. The user or requestor of goods or services uses computer 10 and telephone 18 as previously described. The provider of the goods or services uses a provider system 21 including a provider computer 22 connected to Internet 14 and an automated telephone response system 23. Response system 23 may be a stand-alone device or may be comprised of software and hardware interfaces implemented within computer 22.

Although not shown in this example, a live human operator could also interact with the user (via the telephone call or the data call) and could perform many of the functions of response system 23.

The provider has on-demand goods or services 24 which are delivered to the user/requestor as a result of interaction with system 21. Any type of goods or service can be provided using the present invention, such as mail-order goods, information services, multimedia entertainment services, or the like. These may be provided for payment or for free.

Figure 6:
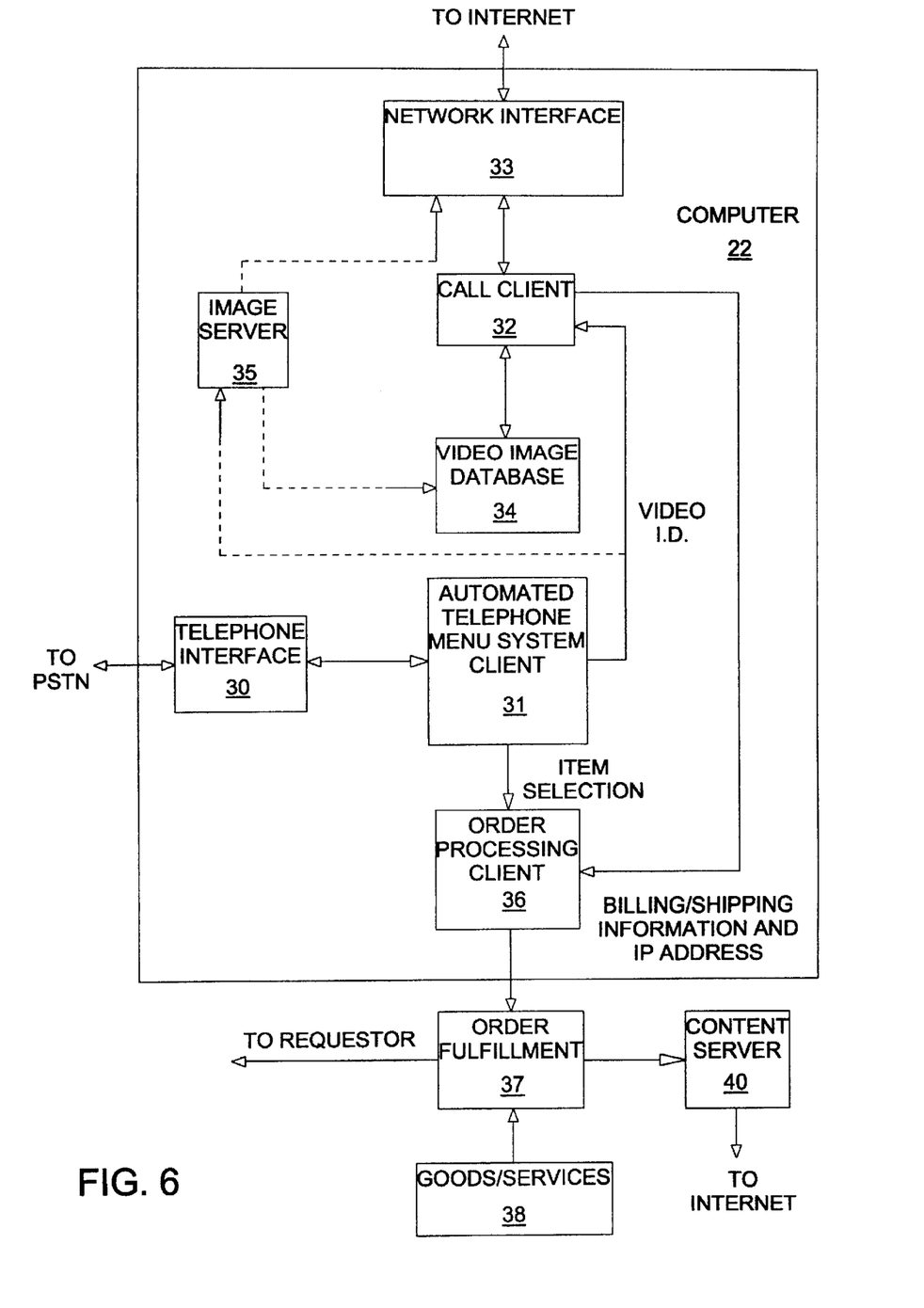
FIG. 6 is a block diagram showing a provided ordering system in greater detail.

FIG. 6 shows provider system 21 in greater detail. Provider computer 22 includes a telephone interface 30 for interconnecting an automated telephone menu system client (i.e., software program) 31 to the public switched telephone network in order to receive telephone calls from requesters. Automated telephone menu system (ATMS) client 31 may be very similar to existing commercially available systems such as the PIVR Call Centre Solution from Pulse Software and Consulting of Markham, Ontario, Canada, for example.

ATMS client 31 is coupled to a call client 32 which effectuates the data network call via a network interface 33. ATMS client 31 presents selection menus to a requestor using audio prompts transmitted via the telephone call. ATMS client 31 is responsive to return audio signals from the user (either DTMF tones or spoken commands) constituting selection signals by which the user 1) browses the menus, and 2) indicates a selection of the goods or services. Thus, telephone interface 30 and/or ATMS client 31 preferably include an DTMF tone detector and/or a voice recognition system. In an alternative embodiment, menu prompts from the ATMS client and return selection signals from the requestor can be signaled via the data call using conventional computer interface methods.

As ATMS client 31 navigates through its menu system, a video ID signal is provided to call client 32 to identify content in a video image database 34 contextually appropriate for the current location in the menu. For example, where the present invention is used for acquiring on-demand video services (e.g., pay per view), the menu may be comprised of video programs available and the contextual video content to be shown may be comprised of a "trailer" or preview of the video program. As described in co-pending application U.S. Ser. No. 10/058,549, a separate server client 35 may optionally be launched in parallel with call client 32 for purposes of streaming the video to the requestor.

Once a requester completes their selection of goods or services, the item selection(s) are sent to an order processing client 36. Preferably, the requestor's billing/shipping address and credit card information are stored by and retrieved from the central server. Alternatively, the requester can be prompted to provide these through the ATMS client (or a live operator). Order processing client 36 may verify that any requested goods are in stock, electronically obtain credit card approval, and perform other accounting functions, for example. Order information is then provided to an order fulfillment system 37 which actually retrieves the goods or services 38 and delivers them to the requester.

By way of one example, the requested service may be to view an on-demand video/audio program via the requestor's Internet connection. Thus, a content server 40 containing the program may be triggered by order fulfillment system 37 to transmit the program to the requestor's computer. The IP address of the requestor's computer is obtained from call client 32 through order processing client 36, for example. The program may be transmitted using the same data call (as described in co-pending U.S. application Ser. No. 10/058, 549) or a separate network session can be established. In yet another example, a selected video/audio program may instead be provided over a non-Internet connection, such as a cable television connection (e.g., cable pay-per-view).

Figure 7:
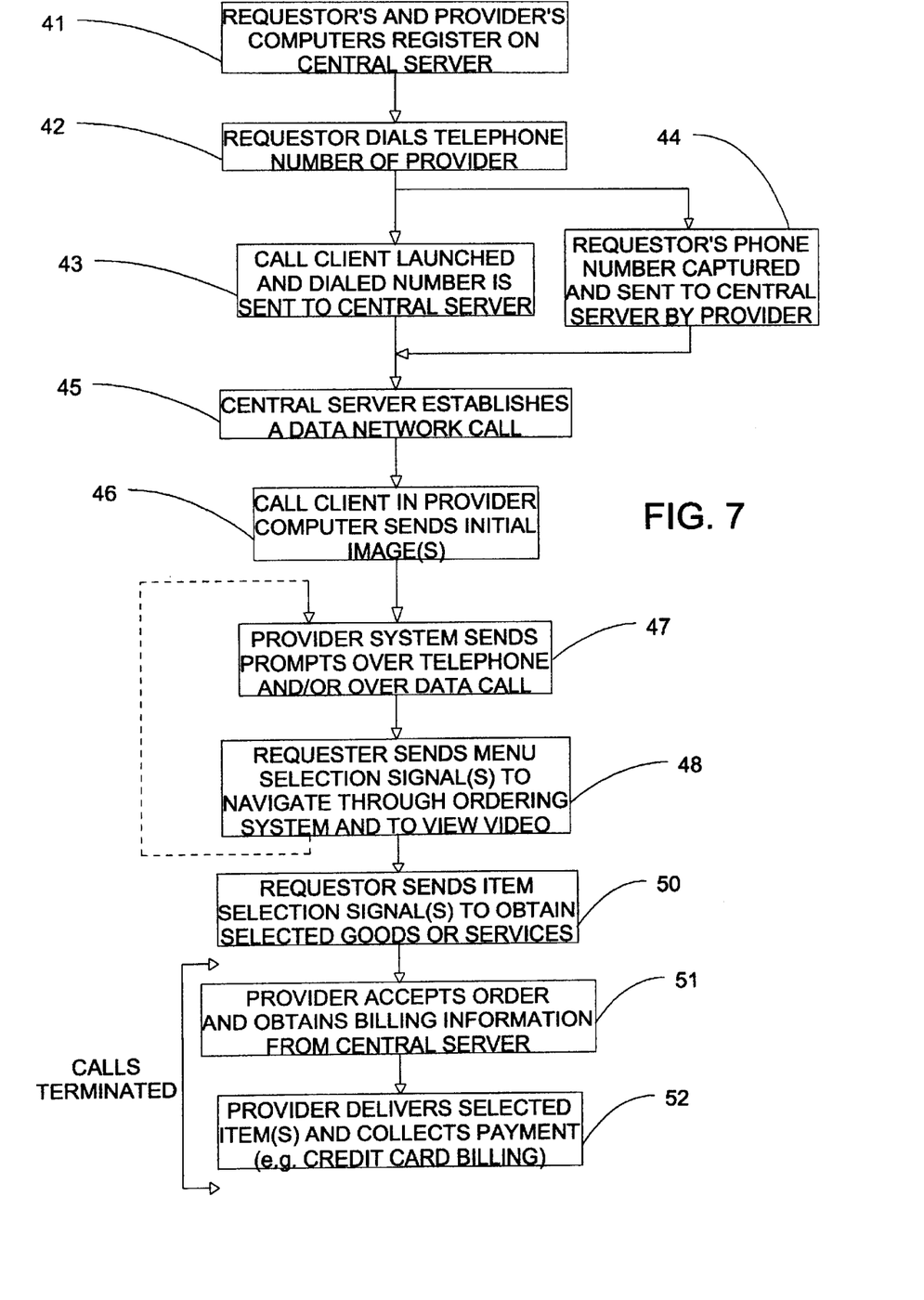
FIG. 7 is a flowchart showing preferred embodiments for acquiring goods or services from a provider using the present invention.

A method of the present invention is shown in greater detail in FIG. 7. In step 41, both the provider's computer and the user/requestor's computer are registered with the central server. At such time that the requester decides to acquire a good or service, the requester initiates a telephone call to the provider in step 42. The provider's telephone number may have been obtained from print or television advertisements or from a telephone book (e.g., yellow pages), for example.

In a first preferred embodiment, the contact to the central server to set-up the data call is done with the requester as the calling party. Thus, a call client is launched in the requestor's computer and the dialed telephone number of the provider is captured and sent to the central server by the requestor's computer in step 43. Alternatively, the provider may need to be the calling party for purposes of the network data call. This can be achieved by having the central server command the call clients accordingly, or, as shown in step 44, the requestor's phone number may be captured by the provider's computer and sent to the central server by the provider to initiate the data call.

In step 45, the data network call is established so that network packets are exchanged between the call clients of the requester and provider computers. Preferably, a welcome message or other initial still or motion video image is automatically sent from the provider to the requestor in step 46 immediately after the data call is established. In step 47, the provider system sends menu prompts to the requestor via the telephone call and/or the data call. In step 48, the requestor sends menu selection signals to navigate through the menu options of the ordering system and to view contextual video synchronized with the particular locations within the menu. For example, a first menu prompt might say "press 1 for drama movies, 2 for children's movies, and 3 for comedy." A still image may be sent to the requestor within the data call having a graphic to reinforce the choices. After pressing a selection, a second menu may present choices for specific movie titles (e.g., speaking the titles over the telephone call and showing the titles in a graphic over the data call). After selecting a movie title (e.g., pressing a digit on the requestor's telephone or clicking a button in the call client), a trailer for the selected movie may appear on the requestor's computer, allowing the requester to decide whether or not to order up the movie for pay-per-view. In playing the trailer or other video, the present invention can conserve bandwidth over the computer network by playing the audio portion of the trailer over the telephone call, for example.

As shown in FIG. 7, steps 47 and 48 may be repeated until the requestor reaches a final selection. The requester sends item selection signals (e.g., DTMF tones, a spoken selection, or clicking an order button in the call client) in step 50 to obtain their selection of goods or services. In step 51, the provider accepts the order and obtains billing information, preferably from the central server so that the requestor need not be asked for it. In step 52, the provider delivers the selected item(s) and collects payment, if any. During steps 51 and 52, the telephone call and the data call are terminated whenever they are no longer needed.

In order to avoid confusion at the provider computer, it may be desirable to defer the initiation of a data call until a telephone call is actually answered by the provider. In other words, the call client of the requestor's computer waits until it receives a signal indicating that the telephone call was accepted. Thus, the provider computer can be sure that an incoming data call matches the telephone call that it is processing. The acceptance signal may be manually generated or may be detected electronically using an add-on device that also captures the dialed telephone number and transfers it to the requestor's computer.

Figure 8:
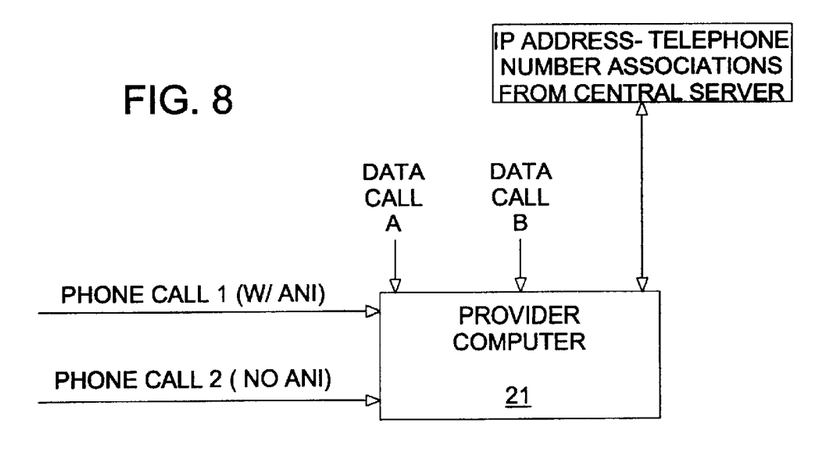
FIG. 8 is a block diagram showing the handling of multiple, simultaneous calls to the provider system.

In the event that the provider system is capable of receiving multiple telephone calls and data calls simultaneously, then steps must be taken to ensure that each phone call is properly associated with the corresponding data call with the same requester. As shown in FIG. 8, provider system 21 receives a phone call #1 and a phone call #2 substantially simultaneously. A data call A and a data call B are also received at about the same time. Due to latency differences in the computer network transmission paths, the data calls may not be received in the same order as the telephone calls. Thus, the telephone and data calls must include identifying information so that they can be properly matched together. As shown in FIG. 8, the matching can be accomplished using IP address-to-telephone number associations from the central server (either by separate query to the central server or as information embedded in the data calls themselves). In a preferred embodiment, each telephone call must include information identifying the telephone number from which the call is originating. Typically, this can be provided by an automatic number identification (ANI) signal (also known as Caller ID). However, this signal may be blocked (i.e., turned off). If blocked, then it may be necessary for the ATMS client to prompt a requestor to manually transfer their telephone number via the telephone call.

Figure 9:
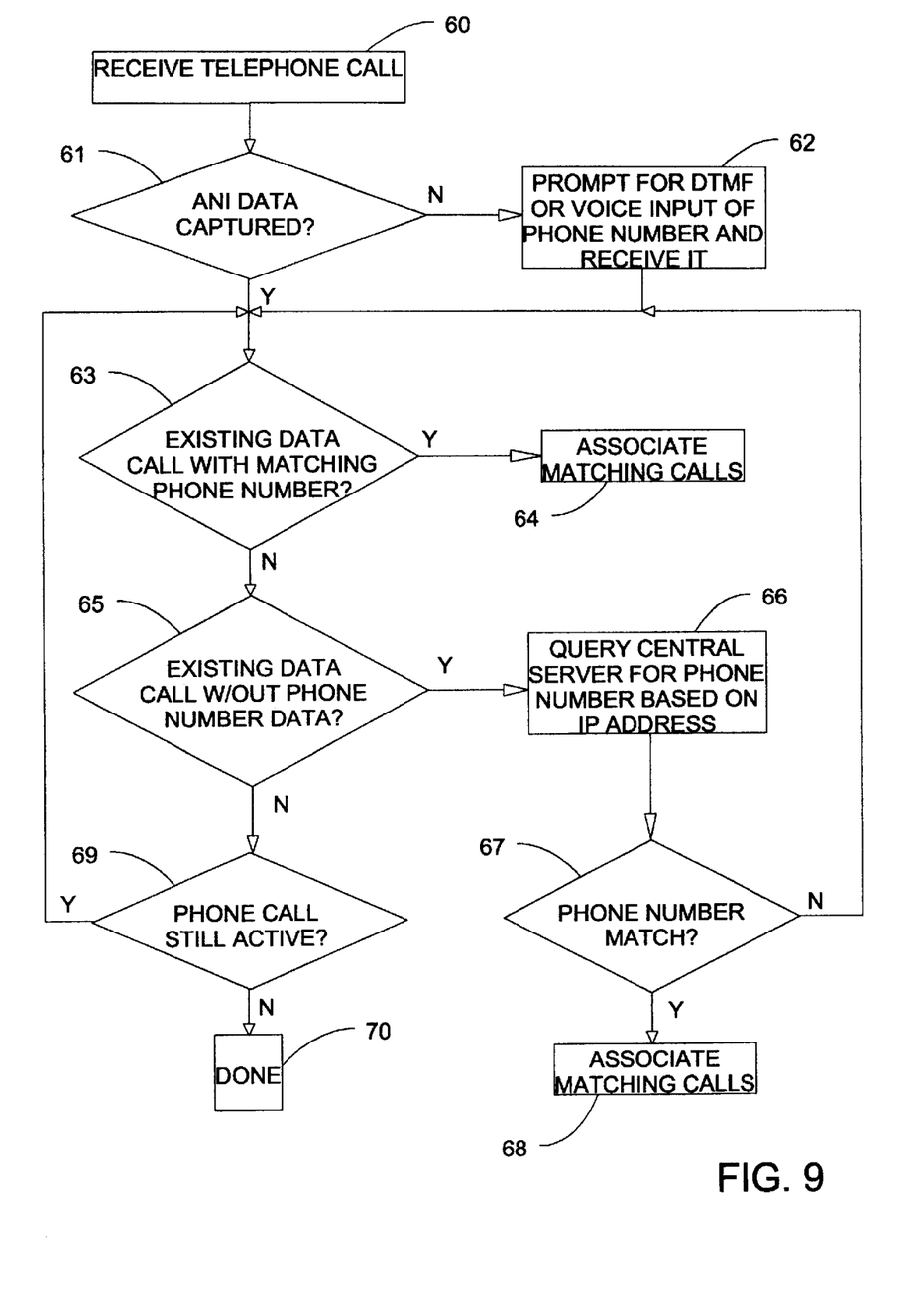
FIG. 9 is flowchart showing a method of handling of multiple, simultaneous calls to the provider system.

One embodiment of a preferred method for matching telephone calls to data calls is shown in FIG. 9. In step 60, a telephone call is received. A check is made in step 61 to determine whether ANI data (e.g., the incoming telephone number transmitted by the PSTN between the first and second rings) was captured. If not, then the provider system prompts the requestor to input their telephone number (by either touch-tone input or by speaking) and the number is received from the requester in step 62.

With the incoming telephone number obtained, a check is made in step 63 to determine whether there is an existing data call having identifying information that matches the incoming telephone number. The data calls may preferably include packets containing the requestor's telephone number. Such packets can be included in a protocol used between the requestor and provider computers, for example. If a matching number is found, then the matching telephone and data calls are associated by the provider system in step 64.

If a match is not yet found, then a check is made in step 65 to determine whether there are pending data calls not yet associated with a telephone call and for which the corresponding telephone number data is unknown. If such a data call is found, then a query message is sent to the central server in step 66 for the telephone number to be associated with the requestor's IP address for those data calls. When the telephone numbers, if any, are received in response to the query, the provider system determines in step 67 whether any match the telephone number of the incoming telephone call. If yes, then the matching telephone and data calls are associated by the provider system in step 68. If there is still no match, then a return is made to step 63 to recheck any new data calls.

If step 65 determines that there are no data calls without telephone number data available, then a check is made in step 69 to determine whether the incoming telephone call is still active. If not, then the method ends at step 70 for that telephone call. Otherwise, a return is made to step 63 to continue to monitor incoming data calls.

Depending upon the capabilities of the provider system or whether live operators are used, incoming telephone calls may be placed into a queue until resources are available to handle a call. In one embodiment of the invention, it may not be necessary to associate the active telephone call with a particular data call. Instead, the video images for the active telephone call may be sent to all data calls (even those in fact associated with a telephone call that is waiting in the queue). The requester with the active telephone call will thus see the desired images. Since the images will also be seen by requesters in the queue, no personal or confidential information would be included in the images. Furthermore, selection signals from the requester could only be transmitted via the telephone call (i.e., the data call becomes a one-way broadcast to the requestors).

What is claimed is:

1. A method of acquiring goods or services from a provider, said method comprising the steps of:
    a requester dialing a telephone number of said provider to establish a telephone call over a public switched telephone network;
    inputting said telephone number to a first computer accessible to said requestor, said first computer being connected to a computer network;
    transmitting said telephone number to a central server within said computer network;
    maintaining within said central server a database of registered providers, their telephone numbers, and IP addresses of provider computers;
    checking said database for said dialed telephone number;
    if said dialed telephone number is found, then establishing a data call between said first computer and a provider computer identified by said database;
    transmitting within said data call video images concerning said goods or services;
    said requester indicating a selection of one of said goods or services.

2. The method of claim 1 further comprising the step of: said provider delivering said chosen good or service to said requestor.

3. The method of claim 1 wherein said video images include at least one initial image selected in response to said dialed telephone number.

4. The method of claim 1 wherein said video images include browsed images selected by said requester.

5. The method of claim 4 wherein said browsed images are selected in response to selection signals transmitted by said requester over said telephone call.

6. The method of claim 5 wherein said selection signals are comprised of DTMF tones.

7. The method of claim 5 wherein said selection signals are comprised of spoken commands.

8. The method of claim 5 wherein said selection signals include an order signal for indicating said selected good or service.

9. The method of claim 4 wherein said browsed images are selected in response to selection signals transmitted by said requester over said data call.

10. The method of claim 1 wherein a service is selected and wherein said telephone call is terminated and then said selected service is provided as an electronic transmission to said requestor.

11. The method of claim 10 wherein said electronic transmission is made over said computer network.

12. The method of claim 10 wherein said data call is terminated and said electronic transmission is made independently of said computer network.

13. The method of claim 1 further comprising the step of:
    said provider obtaining billing information corresponding to said requester from said central server.

14. The method of claim 1 wherein a plurality of requestors establish respective data calls with said provider computer simultaneously, said method further comprising the steps of:
    said provider computer capturing respective requester telephone numbers; and
    associating a respective data call and a respective telephone call in response to a respective association between an IP address and a respective requestor telephone number maintained in said central server.

15. A method of acquiring goods or services from a provider, said method comprising the steps of:
    a requestor dialing a telephone number of said provider to establish a telephone call over a public switched telephone network with a computerized ordering system;
    said provider ordering system capturing a requestor telephone number from which said requester established said telephone call;
    transmitting said requester telephone number to a central server within said computer network;
    maintaining within said central server a database of registered users, their telephone numbers, and IP addresses of requester computers;
    checking said database for said requestor telephone number;
    if said requester telephone number is found, then establishing a data call between said computerized ordering system and a requestor computer identified by an IP address in said database;
    transmitting within said data call video images concerning said goods or services;
    said requester indicating a selection of one of said goods or services; and
    said provider delivering said chosen good or service to said requester.

16. The method of claim 15 wherein said requester telephone number is captured from automatic number identification (ANI) data from said public switched telephone network.

17. The method of claim 15 wherein said requester telephone number is captured by the steps of:
    prompting said requester for said requester telephone number; and
    said requester transmitting audio data over said telephone call identifying said requestor telephone number.

18. The method of claim 17 wherein said audio data is comprised of DTMF tones.

19. Apparatus for responding to a telephone call made to a predetermined telephone number by a requester of goods or services, said requester having a first computer coupled to an internetwork, said apparatus comprising:

an automated telephone response system for automatically answering said telephone call and presenting a menu of selections corresponding to said goods or services in response to selection signals received during said telephone call;

a network interface coupled to said internetwork for communicating with a central server within said internetwork, said central server containing a database of registered providers with their respective telephone numbers and respective IP addresses of provider computers, said database including an IP address assigned to said network interface and said predetermined telephone number;

a data call client communicating through said network interface with said central server to establish a data call between said apparatus and said first computer; and a video image database synchronized to said menu of selections for presenting video images related to said goods or services to assist said requester in a selection.

20. The apparatus of claim 19 further comprising:

a content server for providing a selected service to said requestor via said internetwork.

21. The apparatus of claim 19 wherein said automated telephone response system is responsive to selection signals provided as DTMF tones within said telephone call.

22. The apparatus of claim 19 wherein said automated telephone response system is responsive to selection signals provided as spoken commands within said telephone call.

23. The apparatus of claim 19 wherein said automated telephone response system is responsive to selection signals provided as computer commands within said data call.

24. The apparatus of claim 19 further comprising:

a billing system for obtaining payment from said requester for said selected good or service, said billing system communicating with said central server to obtain billing information corresponding to said requestor.

25. Apparatus for responding to a telephone call made to a predetermined telephone number by a requester of goods or services, said requester having a first computer coupled to an internetwork, said apparatus comprising:

an automated telephone response system for automatically answering said telephone call and presenting a menu of selections corresponding to said goods or services in response to selection signals received during said telephone call;

a central server coupled to said internetwork containing a database of registered providers with their respective telephone numbers and respective IP addresses of provider computers, said database including an IP address assigned to said network interface and said predetermined telephone number;

a network interface coupled to said internetwork for communicating with said central server;

a data call client communicating through said network interface with said central server to establish a data call between said apparatus and said first computer; and a video image database synchronized to said menu of selections for presenting video images related to said goods or services to assist said requester in a selection.

* * * * *